US00RE45369E

(19) United States
(12) Reissued Patent
Wassingbo et al.

(10) Patent Number: US RE45,369 E
(45) Date of Reissued Patent: Feb. 10, 2015

(54) MOBILE DEVICE WITH INTEGRATED PHOTOGRAPH MANAGEMENT SYSTEM

(71) Applicant: Sony Mobile Communications AB, Lund (SE)

(72) Inventors: Tomas Karl-Axel Wassingbo, Malmo (SE); Gunnar Klinghult, Lund (SE); Johan F. Gulliksson, Lund (SE); Eral Denis Foxenland, Malmo (SE); Randi-Lise Hjelmeland Almas, Oslo (NO); Anna-Maria Lagerstedt, Malmo (SE)

(73) Assignees: Sony Corporation, Tokyo (JP); Sony Mobile Communications AB, Lund (SE)

(21) Appl. No.: 13/673,010

(22) Filed: Nov. 9, 2012

Related U.S. Patent Documents

Reissue of:
(64) Patent No.: 7,831,141
Issued: Nov. 9, 2010
Appl. No.: 11/692,946
Filed: Mar. 29, 2007

(51) Int. Cl.
*G03B 17/48* (2006.01)
*H04N 7/14* (2006.01)
*H04M 1/00* (2006.01)

(52) U.S. Cl.
USPC ..... 396/429; 396/310; 348/14.02; 348/552; 455/556.2

(58) Field of Classification Search
USPC ..... 396/429, 310; 348/14.02, 552; 455/556.1, 556.2
See application file for complete search history.

(56) References Cited

U.S. PATENT DOCUMENTS

| | | | |
|---|---|---|---|
| 2002/0140843 | A1 | 10/2002 | Tretter et al. |
| 2004/0207722 | A1 | 10/2004 | Koyama et al. |
| 2005/0283497 | A1 | 12/2005 | Nurminen et al. |
| 2006/0020630 | A1 | 1/2006 | Stager et al. |
| 2006/0140455 | A1 | 6/2006 | Costache et al. |
| 2006/0229063 | A1 | 10/2006 | Koch |
| 2007/0053335 | A1 | 3/2007 | Onyon et al. |
| 2007/0067295 | A1 | 3/2007 | Parulski et al. |
| 2008/0146274 | A1 | 6/2008 | Cho |

(Continued)

FOREIGN PATENT DOCUMENTS

| | | |
|---|---|---|
| EP | 0 944 019 | 9/1999 |
| EP | 1 710 717 | 10/2006 |

(Continued)

OTHER PUBLICATIONS

International Search Report for corresponding Application No. PCT/IB2007/002853 mailed Jan. 22, 2008.

(Continued)

*Primary Examiner* — Rochelle-Ann J Blackman
(74) *Attorney, Agent, or Firm* — Renner, Otto, Boisselle & Sklar, LLP

(57) ABSTRACT

A mobile device comprises a network communication system such as a wide area network mobile telephony system, a camera for capturing a digital photograph, and a photograph management application. The photograph management application receives the digital photograph, obtains an information record comprising information related to the digital photograph; and associates at least a portion of the information related to the digital photograph with the digital photograph. The information record may be obtained from local sources such as a contact directory or from a remote directory server.

40 Claims, 11 Drawing Sheets

(56) References Cited

U.S. PATENT DOCUMENTS

| | | | |
|---|---|---|---|
| 2008/0243861 | A1 | 10/2008 | Wassingbo et al. |
| 2010/0172550 | A1 | 7/2010 | Gilley et al. |
| 2010/0207721 | A1 | 8/2010 | Nakajima et al. |
| 2010/0241658 | A1 | 9/2010 | Rathurs et al. |

FOREIGN PATENT DOCUMENTS

| | | |
|---|---|---|
| JP | 2002-169823 | 6/2002 |
| WO | 03/073304 | 9/2003 |
| WO | 2004/038613 | 5/2004 |
| WO | 2004/049130 | 6/2004 |
| WO | 2004/066613 | 8/2004 |
| WO | 2005/076149 | 8/2005 |
| WO | 2005/114476 | 12/2005 |
| WO | 2007/144692 | 12/2007 |

OTHER PUBLICATIONS

S. J. Brzezowski et al.; "Integrated Portable System for Identification and Tracking"; Proceedings of the SPIE, SPIE, Bellingham, VA, US, vol. 2935, Nov. 19, 2006, pp. 24-35, XP000957348.

Andreas Girgensohn et al.; "Leveraging Face Recognition Technology to Find and Organize Photos"; FX Palo Alto Laboratory; Palo Alto, CA, USA.

Written Opinion of the International Preliminary Examining Authority for corresponding Application No. PCT/IB2007/002854 mailed May 25, 2009.

International Preliminary Report on Patentability for corresponding Application No. PCT/IB2007/002854 mailed Jul. 30, 2009.

International Search Report for corresponding Application No. PCT/IB2007/002854 mailed Aug. 12, 2008.

International Search Report, corresponding to PCT/IB2009/006439, mailed on Nov. 12, 2009.

Written Opinion of the International Searching Authority, corresponding to PCT/IB2009/006439, mailed Nov. 12, 2009.

Al-Baker O; Benlamri R; Al-Qayedi A: "A GPRS-based remote human face identification system for handheld devices" Wireless and Optical Communications Networks, 2005. WOCN 2005., Mar. 6, 2005, pp. 367-371, XP002553181 Piscataway, NJ. USA.

Joonhyun Bae et al: "A Mobile Peer-to-Peer Query in a Social Network" Advanced Language Processing and Web Information Technology, 2008, ALPIT '08. International Conference on, IEEE, Piscataway, NJ, USA, Jul. 23, 2008, pp. 450-453, XP031294433 ISBN: 978-0-7695-3273-8.

| Person ID | Address | Telephone | Email | Text | Birthday | CLID Photo 58 | Photo Sharing 40 |
|---|---|---|---|---|---|---|---|
| Ann | | | | | | Ann | Yes/Email |
| Bill | | | | | | Bill | No |
| Ted | | | | | | Ted | Yes/Email |

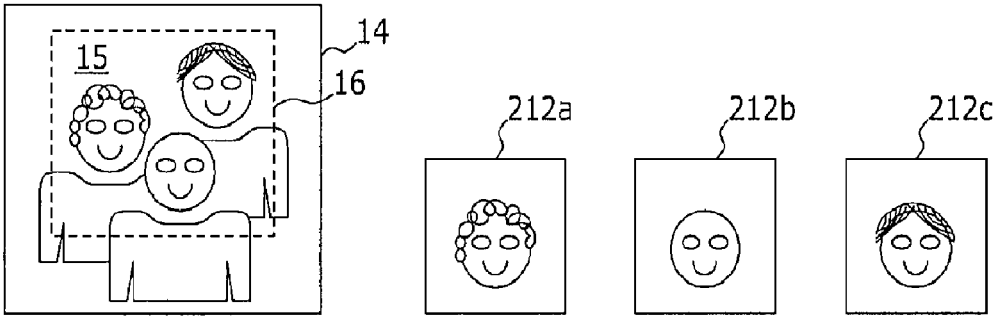

Figure 2a

44

```
<Date> 1-15-07 </Date> ~ 51
<Time> 15:07 </Time> ~ 52
<Location>
   <Country> United States </Country>
   <City> Orlando </City>
   <Other ID> Disney </Other ID>
</Location>
<Primary Content>
   <Category> People </Category> ~ 55
   <Person ID> Ann </Person ID> ~ 56a
      <Email> ann@url.com </Email>
      . . .
   <Person ID> Bill </Person ID> ~ 56b
      <Email> bill@url.com </Email>
      . . .
   <Person ID> Unidentified </Person ID> ~ 56c
</Primary Content>
```

53

54

47

Figure 2b

```
47 {  <Date> 1-15-07 </Date> ~ 51
      <Time> 15:07 </Time> ~ 52
      53 { <Location>
             <Country> United States </Country>
             <City> Orlando </City>
             <Other ID> Disney </Other ID>
           </Location>
      54 { <Primary Content>
             <Category> Dogs </Category> ~ 55
             57 { <Text>
                    Dog Info
                  </Text>
           </Primary Content>
```

44

```
<Date> 1-15-07 </Date> ~ 51
<Time> 15:07 </Time> ~ 52
<Location>
   <Country> United States </Country>
   <City> Orlando </City>
   <Other ID> Disney </Other ID>
</Location>
<Primary Content>
   <Category> Attraction </Category> ~ 55
   <Attraction Data>
      <Attraction ID> Pirates Ship </Attraction ID> ~ 218
      <Text>
         . . . facts . . .
         . . . statistics . . .
         . . . URL for more data . . .
      </Text>
   </Attraction Data>
</Primary Content>
```

53 54 219 47

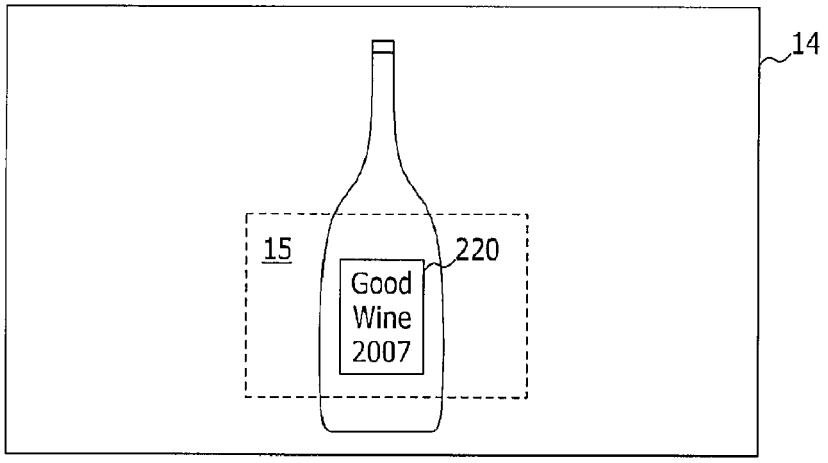

Figure 5a

```
                                                                  44
47 <Date> 1-15-07 </Date> ~ 51
   <Time> 15:07 </Time> ~ 52
53 <Location>
     <Country> United States </Country>
     <City> Orlando </City>
     <Other ID> Disney </Other ID>
   </Location>
54 <Primary Content>
     <Category> Wine Label </Category> ~ 55
221  <Vintage Data>
       <Vintage ID> Good Wine Merlot, 2007 </Vintage ID>
       <Vinyard Location> Nappa, California </Vinyard Location>
       <Awards> Best California Red Wine </Awards>
       . . . Other Data . . .
     </Vintage Data>
   </Primary Content>
```

Figure 5b

| Content Database 43 | |
|---|---|
| Category 238 | Content Recognition Data 45 |
| People | |
| Dogs | |
| Attractions | |
| Wine Labels | |

Figure 6

ID Database (People) 242a

| Index | ID Data 246 | Personal Information 248 | | | | Photo 250 Sharing Indicator | Group Authorization 252 |
|---|---|---|---|---|---|---|---|
| | | Name 248a | Email 248b | Tel. 248c | Etc. 248d | | |
| 1 | | Ann | | | | No | |
| 2 | | Bill | | | | Email | |
| 3 | | Ted | | | | Email | |

244

Figure 11a

ID Database (Dogs) 242b

| Breed 268 | ID Data 269 | Descriptive Data 271 |
|---|---|---|
| 1 | | |
| 2 | | |
| 3 | | |

Figure 11b

ID Database (Attraction) 242c

| Predetermined Locations 256 |
|---|
| Disney, Orlando 256a |
| B |
| C |
| D |
| E |

Attraction List 254

| Attraction ID 255 | Identification Data 258 | Descriptive Data 260 |
|---|---|---|
| Pirates Ship | | |
| 2 | | |
| 3 | | |

Figure 11c

ID Database (Label) 242d

| Vintage | Identification Data 264 | Descriptive Data 266 |
|---|---|---|
| 1 | | |
| 2 | | |
| 3 | | |
| 4 | | |

262

Figure 11d

209

```
217 <Category ID> People </Category ID> ~ 55
    53 <Location>
          <Country> United States </Country>
          <City> Orlando </City>
          <Other ID> Disney </Other ID>
       </Location>
    <Person>
       <Person ID> Ann </Person ID> ~ 211
       <Email> ann@url.com </Email> ~ 212
          . . .
       <Photo Sharing> email </Photo Sharing> ~ 213
    </Person>
    <Person>
       <Person ID> Bill </Person ID> ~ 211
       <Email> bill@url.com </Email> ~ 212
          . . .
       <Photo Sharing> no </Photo Sharing> ~ 213
    </Person>
    <Person>
       <Person ID> Unidentified </Person ID> ~ 215
    </Person>
```

Figure 12a

209

```
217 <Category ID> Dogs </Category ID> ~ 55
    53 <Location>
          <Country> United States </Country>
          <City> Orlando </City>
          <Other ID> Disney </Other ID>
       </Location>
    57 <Text>
          Dog Info
       </Text>
```

Figure 12b

209

217
<Category ID> Attraction </Category ID> 55
53
<Location>
<Country> United States </Country>
<City> Orlando </City>
<Other ID> Disney </Other ID>
</Location>
<Attraction Data>
<Attraction ID> Pirates Ship </Attraction ID> 218
219
<Text>
. . . facts . . .
. . . statistics . . .
. . . URL for more data . . .
</Text>
</Attraction Data>

Figure 12c

209

217
<Category ID> Wine Label </Category ID> 55
53
<Location>
<Country> United States </Country>
<City> Orlando </City>
<Other ID> Disney </Other ID>
</Location>
221
<Vintage Data>
<Vintage ID> Good Wine Merlot, 2007 </Vintage ID>
<Vinyard Location> Nappa, California </Vinyard Location>
<Awards> Best California Red Wine </Awards>
. . . Other Data . . .
</Vintage Data>

Figure 12d

MOBILE DEVICE WITH INTEGRATED PHOTOGRAPH MANAGEMENT SYSTEM

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

TECHNICAL FIELD OF THE INVENTION

The present invention relates to automated systems for organizing and searching digital photographs and, in particular, to automated systems for associating photographs with metadata which relates to one or more images depicted in the digital photograph.

DESCRIPTION OF THE RELATED ART

Use of digital photography has expanded significantly within the past few years. Advances in the quality of digital photography systems combined with decreasing costs of fabricating digital camera components have lead to wide spread use of digital cameras. Further, size reductions, combined with the quality advances and decreasing costs, have enabled integration of digital cameras into various mobile electronic devices such as mobile telephones and personal data assistants (PDAs).

Unlike conventional film photography, which has a cost of expended film associated with each picture taken, digital photography does not an incremental cost associated with each picture. Therefore, a user of a digital camera often captures many more photographs than he or she would have with a traditional film camera.

A challenge associated with capturing many digital photographs is organizing and managing the photographs when they are transferred to a computer system for storage. Typically, each photograph is stored as a file (automatically assigned a file name based on chronological order) within a directory (which is also assigned a directory name based on chronological order).

On obvious approach to organizing and managing digital photographs is to organize the photographs within nested directories with file and directory names that are useful for identifying the image content of the photographs. While such a solution is useful, it is not optimal. Manually changing file names and re-organizing digital photographs into a nested directory structure is time consuming and cumbersome. Further, such a solution does not facilitate searching for, or locating, a photograph if the appropriate directory name and file name are not known.

Several providers of "photo-album" software applications facilitate organization of digital photographs. For example, Photoshop®, available from Adobe Systems®, enables a user to associate text based tags with each photograph. A search feature then enables searching based on such text. While this type of a solution facilitates searching, manually typing text to associate with each photograph can be time consuming and cumbersome.

It has also been proposed to use face recognition technology to assist in associating text based tags with photographs within a collection. In a paper entitled "Leveraging Face Recognition Technology to Find and Organize Photographs", authored by Andreas Girgensohn, John Adcock, and Lynn Wilcox, published in 2004, the authors propose use of a face detector to automatically extract images of faces from photographs. The face images are then sorted by similarity to a chosen model. A user interface presents the sorted face images so that a user may assign the face images to a person (e.g. label the face images). The label assigned to a face image is associated with the photograph from which the face image is extracted. As the user labels extracted face images, the face images become the model for use sorting additional face images. In an alternate variation, the system may assign a name to a face image and prompt the user to confirm the assignment. In yet another variation many similar face images may be presented for the user to label with a person's name (e.g. a bulk assignment approach). After labels are assigned to Photographs, the photographs can be readily organized and sorted by the content of the labels.

One challenge with the proposed systems is that they are designed for use labeling photographs after the photographs are downloaded to a computer system and imported into the application for management. What is needed is an improved system and method for organizing digital photographs that does not suffer the disadvantages of known systems. In particular, what is needed is an improved system and method for automatically associating text based metadata to a digital photograph captured by a mobile device wherein the text based metadata describes an image, or images, depicted in the digital photograph including the identity of people whose image is depicted therein.

SUMMARY

A first aspect of the present invention comprises a mobile device which includes camera for capturing digital photographs and a photograph management application.

The photograph management application receives the digital photograph, obtains an information record comprising information related to the digital photograph, and associates at least a portion of the information related to the digital photograph with the digital photograph.

Associating at least a portion of the information related to the digital photograph with the digital photograph may comprise writing such information to a text based metadata record (such as an XML record) associated with the digital photograph.

In one embodiment, the mobile device may further comprise a network communication system and a contact directory. The contact directory stores a plurality of contact records. Each contact record includes contact information identifying a person and at least one network address associated with the person such as the person's telephone number, email address, and text messaging address. A user interface enables selection of a contact record to initiate a communication to the network address include in the contact record via the network communication system.

The contact record may further include a facial image of the person useful as a call line identification photograph. For example, if the mobile device includes a telephony application for placing and receiving telephone calls via the network communication system, the telephony application may drive the user interface to display the call line identification photograph of a contact record when a caller ID signal of an incoming call matches a telephone number in the contact record.

In this embodiment, the photograph management application may obtain the information record by identifying a selected contact record as the information record. The selected contact record may be a one of the plurality of contact records that includes a facial image (e.g. call line identification photograph) with which at least one facial image depicted in the digital photograph matches.

In a first sub-embodiment, the contact record may further include a photograph sharing indicator identifying one of a photograph sharing setting and a photograph non-sharing setting. In this sub-embodiment, the photograph management application may initiate transmission of a copy of the photograph to an identified address if the photograph sharing indicator included in the selected contact record identifies the photograph sharing setting. An example includes sending the photograph by email to an email address identified in the contact record.

In a second embodiment, the mobile device may further comprise a local communication system for communicating with remote mobile devices within a communication zone surrounding the mobile device in which the mobile device may electronically communicate. For example, the local communication system may be any of a Bluetooth radio®, a Wi-fi radio, a near field communication system, an infrared communication system, or other local communication system with a communication range defining the communication zone around the mobile device.

In this second embodiment, the photograph management application may obtain the information record by displaying an indication of each of a plurality of remote mobile devices within the communication zone. For example, if the local communication system is a Bluetooth® radio, the photograph management application may drive the Bluetooth® radio to enter a discovery mode to identify all other Bluetooth® enabled devices with which the mobile device may establish a communication session.

The photograph management application then displays at least one facial image depicted in the digital photograph and obtains user selection of a selected remote mobile device. The user views the facial image and recognizes the person as one of the people within the communication zone. The selected remote mobile device is the one of the plurality of remote mobile devices that the user identifies as belonging to the person within the communication zone who is depicted in the digital photograph.

The photograph management application then attempts to obtain, as the information record, a personal contact record from the selected remote mobile device. The personal contact record, which may be an electronic business card, comprises identification of the user of the selected remote mobile device. Assuming that the remote device authorizes sending of the personal contact record to the mobile device, the mobile device uses the personal contact record as the information record, at least a portion of which is associated with the digital photograph.

Again, in one sub-embodiment, the personal contact record further includes a photograph sharing indicator identifying one of a photograph sharing setting and a photograph non-sharing setting. In this sub-embodiment, the photograph management application initiates transmission of a copy of the photograph to the selected remote mobile device if the photograph sharing indicator identifies the photograph sharing setting. Such transmission may be via the local communication system. Alternatively, such transmission may be by other means such as by email to an email address included in the personal contact record.

In another sub-embodiment wherein the mobile device includes a contact directory, the photograph management application may further write the personal contact record to the contact directory as a new record. Further yet, the facial image depicted in the digital photograph may be associated the new contact record as its call line identification photograph. As such, the facial image depicted in the digital photograph may function as a call line identification photograph and may provide a basis for identifying images of the person in other digital photographs captured in the future.

In another sub-embodiment, the mobile device may itself include an owner identification record (e.g. an electronic business card of the owner of the mobile device). Such record may further include an owner sharing indicator identifying one of a sharing setting and a non-sharing setting. The mobile device may provide the owner identification record to a remote mobile device within the communication zone upon the remote mobile device initiating a request for the owner identification record if the sharing indicator is set to the sharing setting.

For example, if a user of a remote mobile device with capabilities similar to the mobile device captures a photograph in which the owner of the mobile device is depicted, the remote mobile device may initiate a request for the owner identification record. If the sharing indicator is set to a sharing setting, the mobile device may provide the owner identification record to the remote mobile device.

In a third embodiment, the mobile device may comprise a network communication system for communication with a remote directory server over a wide area network such as a combination of a mobile telephone service provider network, an Internet Service Provider network; and the public Internet.

In this third embodiment, the photograph management application may obtain the information record by initiating a request to a remote directory server via the network communication system. The request may include a digital image embodying at least a portion of the digital photograph. A response is received from the remote directory server that includes the information record.

In an example wherein the digital image includes a facial image of a person depicted in the digital photograph, the information the information record may comprises a persona contact record (e.g. an electronic business card) which includes an identification of the person depicted in the digital photograph.

In a sub-embodiment of this example, the request may further include a source identification which identifies the mobile device as the source of the request. The personal contact record (as stored at the directory server) may further include a group authorization record identifying a source, category of sources, group of sources, or other criteria for determining whether a source of a request is authorized to receive the personal contact record.

If the source identification identifies the source as a source authorized to receive the personal contact record, the information record of the response includes the personal contact record. Otherwise, the information record may comprise an indication that identification the person depicted in the digital photograph is unauthorized.

In another sub embodiment of this example, the personal contact record may further include a photograph sharing indicator identifying one of a photograph sharing setting and a photograph non-sharing setting. The photograph management application may initiate transmission of a copy of the photograph to an identified address (for example, an email address) if the photograph sharing indicator identifies the photograph sharing setting.

In a second example, the mobile device may further comprise a global positioning system for identifying a location at which the digital photograph was captured and the digital image may be an image of an attraction depicted in the digital photograph.

In this example, the request may further comprise a location identifier identifying the location at which the photograph was captured. The information record of the response may include descriptive data associated with the attraction such as identification of the attraction.

Other descriptive data associated with the attraction may include a geographical identifier identifying a region within which the digital photograph was captured. For example, if the location identifier of the request includes GPS coordinates within the confines of the Disneyland Park, the geographical identifier may identify the region as any of Disneyland, Orlando, and/or Florida.

In a third example, the digital image may be an image of a wine bottle label (identifying a vintage of wine) depicted in the digital photograph. In this example, the information record may comprise descriptive data associated with the vine vintage.

In a fourth embodiment, the mobile device may further comprise a primary content database and a user interface comprising a display screen and an information entry system such as a touch screen, key pad, or other controls. The primary content database may associate, for each of a plurality of categories, an identification of the category with content recognition data.

In this fourth embodiment, the photograph management application may obtain the information record by applying the content recognition data for each of the plurality of categories of the primary content database to an image depicted in the digital photograph to identify a selected category. The selected category is the category that includes content recognition data with which the image corresponds.

In a sub embodiment of this fourth embodiment, the content recognition data may be exchanged with a selected remote device—for example by email, Bluetooth®, Wi-fi, near field communication system, infrared, or other communication system. This enables content recognition data from the primary content database of the mobile device to be sent to the selected remote mobile device and enables content recognition data received from the remote mobile device to be entered into the primary content database as a new category or as supplemental content recognition data for a new category.

In another sub embodiment of this fourth embodiment, the image may be displayed in association with an identification of the selected category for user confirmation. When confirmed, the selected category is associated as the information record with the digital photograph. Alternatively, the user may, rather than confirming the selected category, enter a new category identifier via the information entry system.

In which case, the new category is: i) associated as the information record with the digital photograph; and ii) written, in combination with content recognition data, to the primary content database as a new category to use as a model for categorizing contents of future photographs (e.g. a form of learning).

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

It should be emphasized that the term "comprises/comprising" when used in this specification is taken to specify the presence of stated features, integers, steps or components but does not preclude the presence or addition of one or more other features, integers, steps, components or groups thereof.

BRIEF DESCRIPTION OF THE DRAWINGS

FIG. 2a is a diagram representing an exemplary digital photograph in accordance with one embodiment of the present invention;

FIG. 2b is a diagram representing an exemplary metadata record in accordance with one embodiment of the present invention;

FIG. 5a is a diagram representing an exemplary digital photograph in accordance with one embodiment of the present invention;

FIG. 5b is a diagram representing an exemplary metadata record in accordance with one embodiment of the present invention;

FIG. 6 is a table depicting an exemplary content database in accordance with one embodiment of the present invention;

FIG. 11a depicts an exemplary identification database associated with the "people" category in accordance with one exemplary embodiment of the present invention;

FIG. 11b depicts an exemplary identification database associated with the "people" category in accordance with one exemplary embodiment of the present invention;

FIG. 11c depicts an exemplary identification database associated with the "attractions" category in accordance with one exemplary embodiment of the present invention;

FIG. 11d depicts an exemplary identification database associated with the "wine vintage" category in accordance with one exemplary embodiment of the present invention;

FIG. 12a depicts an exemplary response metadata structure associated with the "people" category in accordance with one exemplary embodiment of the present invention;

FIG. 12b depicts an exemplary response metadata structure associated with the "dogs" category in accordance with one exemplary embodiment of the present invention;

FIG. 12c depicts an exemplary response metadata structure associated with the "attractions" category in accordance with one exemplary embodiment of the present invention; and FIG. 12d depicts an exemplary response metadata structure associated with the "wine labels" category in accordance with one exemplary embodiment of the present invention.

DETAILED DESCRIPTION OF EMBODIMENTS

Figure 1:
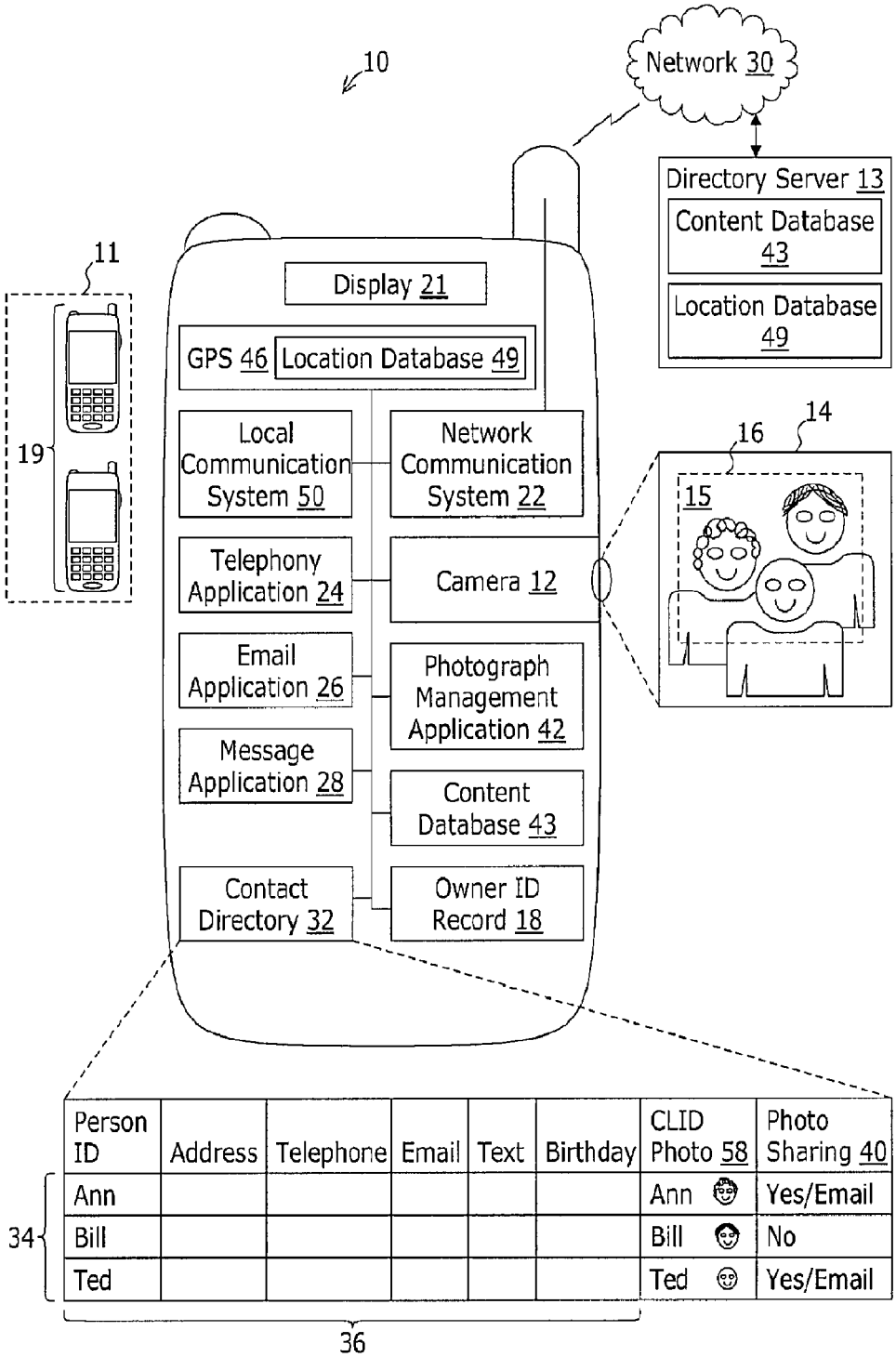
FIG. 1 is a diagram representing an exemplary mobile device implementing a photograph management system in accordance with one embodiment of the present invention.

The term "electronic equipment" as referred to herein includes portable radio communication equipment. The term "portable radio communication equipment", also referred to herein as a "mobile radio terminal" or "mobile device", includes all equipment such as mobile phones, pagers, communicators, e.g., electronic organizers, personal digital assistants (PDAs), smart phones or the like.

Many of the elements discussed in this specification, whether referred to as a "system" a "module" a "circuit" or similar, may be implemented in hardware circuit(s), a processor executing software code, or a combination of a hardware circuit and a processor executing code. As such, the term circuit as used throughout this specification is intended to encompass a hardware circuit (whether discrete elements or an integrated circuit block), a processor executing code, or a combination of a hardware circuit and a processor executing code, or other combinations of the above known to those skilled in the art.

In the drawings, each element with a reference number is similar to other elements with the same reference number independent of any letter designation following the reference number. In the text, a reference number with a specific letter designation following the reference number refers to the specific element with the number and letter designation and a reference number without a specific letter designation refers to all elements with the same reference number independent of any letter designation following the reference number in the drawings.

With reference to FIG. 1, an exemplary mobile device 10 is embodied in a mobile telephone, mobile PDA, or other mobile device which may include a network communication system 22 and one of a telephony application 24, an email application 26, and/ot a messaging application 28 for communication with other devices over a wide area network 30 with which the network communication system 22 is compatible. In the exemplary embodiment, the wide area network 30 may be any combination of a wireless telephone service provider network, an Internet service provider network, a wide area data network and/or the public Internet.

The mobile device 10 may comprise a contact directory 32 which includes a plurality of contract records 34. Each contact record 34 may include traditional contact information fields 36 such as the person's name, address, telephone number, email address, text message address, birth date, and etc. The contract directory 32 serves its traditional purpose of providing a network address (e.g. telephone number, email address, text address) associated with the person identified in the contact record 34 to enable any of the telephony application 24, email application 26, or messaging application 28 to initiate a communication (message or session) to the network address via the network communication system 22.

Further, each contact record 23 may include a call line identification photograph 58 which is a facial image of the contact. In the exemplary embodiment, the telephony application 24 drives a user interface 21 to display the call line identification photograph 58 when a caller ID signal of an incoming telephone call matches a telephone number in the contact record 34 in which the call line identification photograph 58 is included.

The mobile device 10 further comprises a digital camera system 12, a photograph management application 42 and a content database 43. In general, the digital camera system 12 is used for capturing a digital photograph 14 and the photograph management application 42: i) obtains an information record comprising information related to the digital photograph; and ii) associates at least a portion of the information related to the digital photograph, as text based metadata, with the captured photograph 14. The information record may be obtained from any combination of the content directory 32, the content database 43, or a remote source such as a content database 43 operated by a remote directory server 13. The text based metadata identifies content depicted in the digital photograph 14 such that a collection of photographs can be readily searched and/or sorted based on content (e.g. searched or sorted using the metadata).

Turning briefly to FIG. 2a, it is envisioned that each digital photograph 14 may include primary content 15 within a central or prominent zone 16. In the example of FIG. 2a, the prominent zone 16 is generally within the center of the digital photograph 14 and the primary content 15 is people (e.g. a plurality of facial images 212a, 212b, and 212c).

Turning briefly to FIG. 2b exemplary metadata 44 associated with a photograph 14 may be structured as an XML record 47. The use of XML structure is exemplary only and not intended to limit the scope of the present invention. The exemplary XML metadata record 47 may include: i) a date element 51 identifying the date the photograph 14 was taken; ii) a time element 52 identifying time the photograph 14 was taken; iii) location elements 53 identifying the location where the photograph was taken—which may include identification of any permutation of GPS latitude/longitude, country, city, and/or other location identification information such as identification of an attraction such as "Disney®"; and iv) primary content elements 54 which includes a category identifier element 55 and, in this example wherein the primary content category is "people", may include, for each person depicted in the photograph 14, a person identification element 56a, 56b, and 56c identifying the person. Further, additional information elements related to the person, such as email address, may also be included. It should be appreciated that an unidentifiable person may be identified in a person identification element as "unidentified" as represented by person identification element 56c.

Figures 3A, 3B:
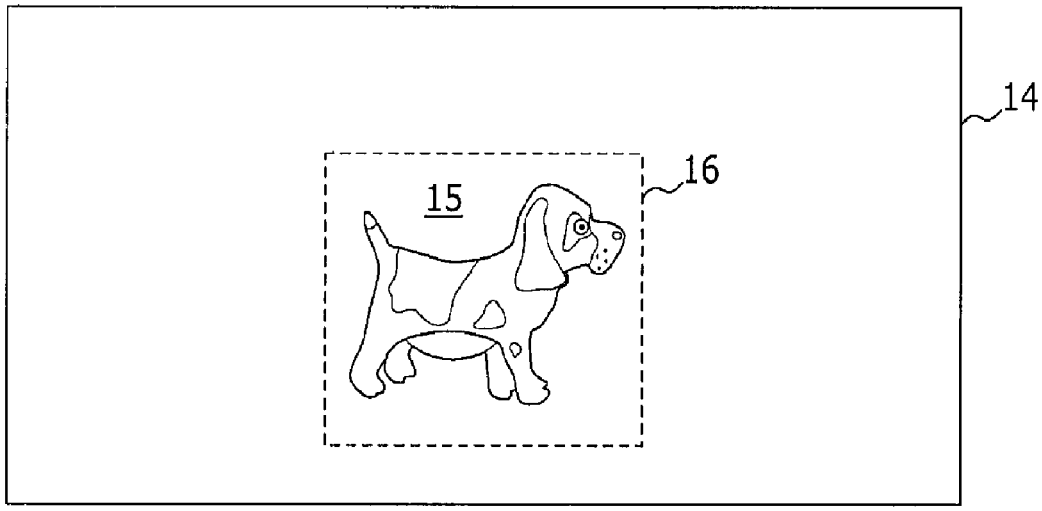
FIG. 3a is a diagram representing an exemplary digital photograph in accordance with one embodiment of the present invention.
FIG. 3b is a diagram representing an exemplary metadata record in accordance with one embodiment of the present invention.

The diagram of FIG. 3a represents an example wherein the digital photograph 14 includes primary contents 15 depicting a dog within the prominent zone 16. Referring briefly to FIG. 3b, an exemplary XML metadata record 47 includes: i) a date element 51 identifying the date the photograph 14 was taken; ii) a time element 52 identifying time the photograph 14 was taken; iii) location elements 53 identifying the location where the photograph was taken; and iv) primary content elements 54 which includes a category identifier element 55 and, in this example wherein the primary content category is "dogs", may include sub data elements 57 further identifying the subject matter within the category of dogs such as breed, dog's name, owner's name.

Figures 4A, 4B:
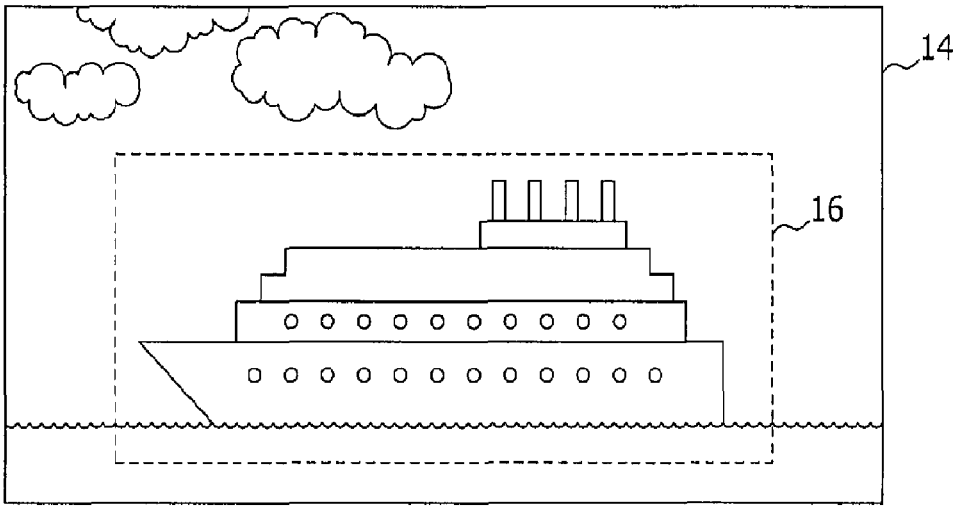
FIG. 4a is a diagram representing an exemplary digital photograph in accordance with one embodiment of the present invention.
FIG. 4b is a diagram representing an exemplary metadata record in accordance with one embodiment of the present invention.

The diagram of FIG. 4a represents an example wherein the digital photograph 14 includes primary contents 15 depicting an attraction which may be any of a building, architecture or artistic structure, prominent natural landscape feature, ship, or other object of interest. Referring briefly to FIG. 4b, an exemplary XML metadata record 47 includes: i) a date element 51 identifying the date the photograph 14 was taken; ii) a time element 52 identifying time the photograph 14 was taken; iii) location elements 53 identifying the location where the photograph was taken; and iv) primary content elements 54 which includes a category identifier element 55 and, in this example wherein the primary content category is "attraction" may include sub data elements such an attraction identifier element 218 identifying the attraction and additional information 219 about the attraction such as facts, statistics, and/or a URL for obtaining even more information about the attraction.

The diagram of FIG. 5a represents an example wherein the digital photograph 14 includes primary contents 15 depicting a wine bottle label 220. Referring briefly to FIG. 5b, an exemplary XML metadata record 47 includes: i) a date element 51 identifying the date the photograph 14 was taken; ii) a time element 52 identifying time the photograph 14 was taken; iii) location elements 53 identifying the location where the photograph was taken; and iv) primary content elements 54 which includes a category identifier element 55 and, in this example wherein the primary content category is "wine label" may include vintage data elements 221 which identify the vintage, the vineyard location, awards won by the vintage, and other data that wine connoisseurs may typically desire to know about a vintage.

It should be appreciated that associating the exemplary metadata records 47 depicted in FIGS. 2b, 3b, 4b, and 5b, with each digital photograph within a collection of photographs enables the collection to be readily searched and/or sorted based on content (e.g. searched or sorted using the text based metadata).

Returning to FIG. 1, the photograph management application 42 may obtain the information record for generating each XML metadata record by: i) referencing an internal clock system (not shown) for identifying the date and time at which the digital photograph was taken; and ii) referencing a global positioning system (GPS) 46 to obtain a location at which the digital photograph was taken.

Further, to obtain identification of the location at which the digital photograph was taken in terms of country, state, city, street, region, attraction, or other human recognizable terms, the photograph management application 42 may reference a GPS database 49 which associates GPS coordinates with such human recognizable terms. In one embodiment, the GPS database 49 may be local in the mobile device 10. Alternatively, the GPS database 49 may operated on a remote directory server 13.

For purposes of categorizing the primary contents 15 of a digital photograph 14, the photograph management application 42 may access a primary content database 43 which also be local on the mobile device 10 or operated on a remote directory server 13.

Turning briefly to FIG. 6 an exemplary primary content database 43 may include, for each a plurality of predetermined categories 238, content recognition data 45 for categorizing primary content 15 within one of a plurality of predetermined categories 238 such as people, dogs, attractions, and wine labels. The content recognition data 45 may be in the form of a model photograph to which the image within the prominent zone 16 may be compared. Alternatively the content recognition data 45 may be in the form of feature data representative of the category (e.g. people dogs, attractions, and wine labels) that may be applied to extracted features from the prominent zone 16 to determined to which category the primary content 15 best corresponds.

Returning to FIG. 1, after determining the category of the primary contents 15 of the digital photograph 14, the photograph management application 42 may obtain additional information about the subject matter depicted in the digital photograph 14 (e.g. category specific information about the subject matter) either by accessing data stored by the mobile device 10 or by obtaining such additional information from the directory server 13.

In one particular embodiment, the photograph management application 42 may identify people depicted in the digital photograph 14 by accessing the contact directory 32, and in particular the call line identification photographs 58 of the contact directory 32 for purposes of comparing the image of a person depicted in the digital photograph 14 to the call line identification photographs 58 to identify the person depicted in the digital photograph 14.

Figure 7:
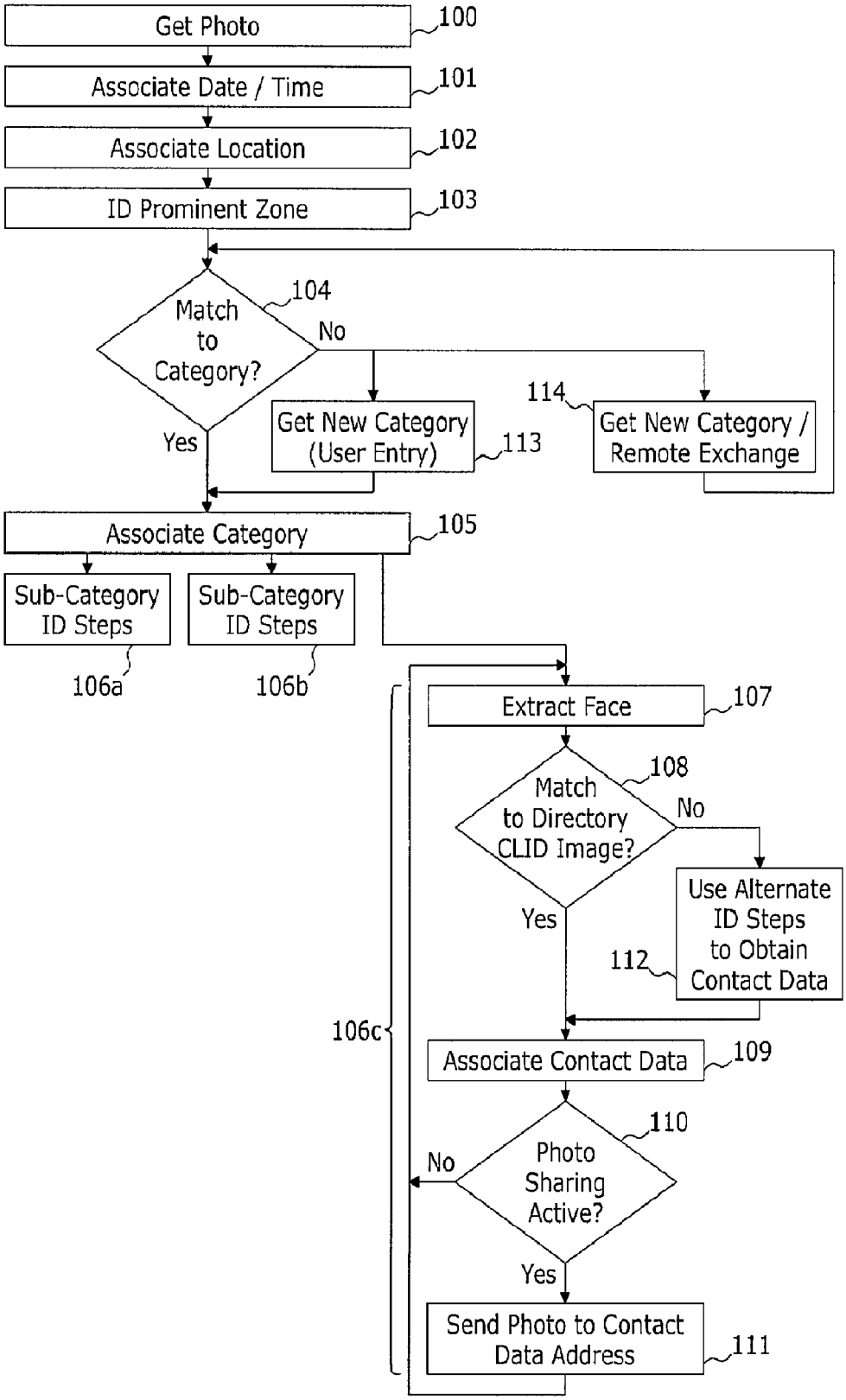
FIG. 7 is a flow chart diagram representing exemplary operation of a photograph management application in accordance with one embodiment of the present invention.

The flow chart of FIG. 7 represents an exemplary aspect of operation of the photograph management application 32 for: i) obtaining an information record comprising information related to a digital photograph; and ii) associating at least a portion of the information record to the digital photograph as an XML metadata record 47 as depicted in any of FIGS. 2b, 3b, 45, and 5b.

Referring to FIG. 7 in conjunction with FIG. 1, step 100 represents receiving the photograph 14 from the camera system 12.

Step 101 represents referencing an internal clock (not shown) to determine the date and time at which the digital photograph 14 was captured and associating such date and time to the digital photograph 14 by writing a date element 51 and a time element 52 to the metadata record 47 (FIGS. 2b, 3b, 4b, and 5b) associated with the digital photograph 14.

Step 102 represents associating a location at which the digital photograph 14 was captured with the digital photograph 14 by writing location elements 53 to the metadata record 47. As discussed, the mobile device 10 may include a GPS system 46 which detects signals from GPS satellites and calculates the location (typically longitude, latitude, and elevation) of the mobile device 10 there from. The photograph management application 42 may access the location database 49 (local or remote) to obtain identification of the location in terms of country, state, city, street, street address, prime attraction, or other human recognizable text based data useful for referencing the location. Step 102 represents writing such text based location data to the applicable location elements 53 of the metadata record 47 (FIGS. 2b, 3b, 4b, and 5b) associated with the digital photograph 14.

Step 103 represents identifying the prominent zone 16 wherein the primary content 15 is located. The prominent zone 16 will typically be the center of the photograph 14, but may be offset from the center. If offset, the prominent zone 16 may be recognized by its inclusion of prominent features—as opposed to less prominent background.

Step 104 represents categorizing the primary content 15 within the prominent zone 16 by referencing the primary content database 43 (local or remote) to determine to which classification the primary content 15 best corresponds.

As discussed, the primary content database 43 may include content recognition data 45 for classifying primary content 15 within one of a plurality of predetermined categories such as people, buildings, horses, and wine labels. The photograph management application 42 may compare the image within the prominent zone 16 with the content recognition data 45 to determine to which of the predetermined categories the primary content 15 best corresponds.

Further, in the event that a primary content category cannot be identified at step 104 (for example the primary contents does not correspond to any of the predetermined categories within the primary content database 43), the photograph management application 32 may: i) drive the user interface 21 to prompt the user to enter a new category at step 113; and/or, as an alternative embodiment ii) obtain new category and/or content recognition data from a remote source at step 114.

In the event that the photograph management application 32 drives the user interface 21 to prompt the user to enter a new category at step 113, The text entered by the user to identify the new predetermined category is then added to the primary content database 43 along with data representative of the image (from the digital photograph 14) to use as the model for categorizing contents of future photographs to such category.

The photograph management application 32 may obtain new category and/or content recognition data form a remote source by: i) exchanging category and content recognition data with a remote mobile device 19 (FIG. 1) by any of email, Bluetooth®, Wi-fi, near field communication system, infrared, or any other communication protocol supported by either a local communication system 50 (FIG. 1 and discussed herein) or the network communication system 22. In the event that new category and/or content recognition data is obtained from a remote source, the new category and/or content recognition data may be written to the primary content database 43 (local on the mobile device 10). Thereafter, step 104 may be repeated by the photograph management application 32 to utilizes new category and/or content recognition data to identify the primary content 15 within the prominent zone 16 of the digital photograph 14.

The primary content category (either as identified if an existing predetermined category or as entered if a new category) is associated (as metadata) with the photograph 14 which may include writing the category element 55 to the metadata record 47 (FIGS. 2b, 3b, 4b, and 5b).

After categorizing the digital photograph 14, different steps may be associated with each category for obtaining further information about the subject matter for association with the digital photograph.

For example, if the primary content is categorized as "people", the further information may include identification of each of the people depicted in the digital photograph 14 as discussed with reference to FIG. 2b. If the primary content is categorized as "dogs" the further information may include identification of a dog by name, breed, etc as discussed with reference to FIG. 3b. If the primary content is categorized as "attraction", the further information may include identification of the attraction and other information about the attraction as discussed with reference to FIG. 4b. If the primary content is categorized as "wine label" the further information may include vintage data as discussed with reference to FIG. 5b. Steps 106a, 106b, and 106c generically represent performance of category specific steps for obtaining such further information based on the category of the primary content.

Of particular relevance is step 106c which comprises 107 through 111 which are executed for identifying people within a digital photograph 14 when the primary content 15 is categorized as "people". Steps 107 through 111 may be repeated for each person depicted in the prominent zone 16 of a digital photograph 14 to identify each such person.

Step 107 represents extracting a facial image (for example facial image 212a of FIG. 2a) of a person from digital photograph 14.

Step 108 represents the photograph management application 42 comparing the extracted facial image 212a to the call line identification photographs 58 of the contact directory 32 to determine whether the extracted facial image 212a corresponds to an existing contact.

If the extracted facial image 212a matches the call line identification photograph 58 of a record 34, such record may be referred to as the selected contact record. The photograph management application 42 obtains the selected contact record as the information record and associates with the digital photograph 14 at least a portion of the contact information 36 (for example the person's name) from the selected contact record with the photograph 14 at step 109. As discussed with respect to FIG. 2b, this may include writing a person identifier element 56 to the metadata record 47. It is further envisioned that other contact information 36 such as the person's email, phone number, etc may be written to the metadata record 47 with appropriate element tags.

Step 110 represents determining whether photograph sharing is active for the person represented by the contact information associated with the photograph at step 109. Each record 34 of the contact directory 32 may include a photograph sharing indicator 40 identifying a photograph sharing setting as active or inactive. An active setting may be identified by the inclusion of an identification of "email" or a properly formatted "email address" within the field of the photograph sharing indicator 40. If active, the photograph management application 42 initiates a communication, via the network communication system 22 (or a local communication system 50 discussed herein) to a one of the network addresses included in the selected contact record 34 (and identified in the field of the photograph sharing indicator 40) and sends the digital photograph 14 to such network address at step 111. As such, the person depicted in the digital photograph 14 will receive a copy of the digital photograph 14.

Returning to step 108, if the extracted facial image 212a does not match the call line identification photograph 58 of any of the existing contact records 34, alternate identification steps (represented by step 112) may be taken to identify the person and obtain contact information for association with the photograph 14.

Figure 9A:
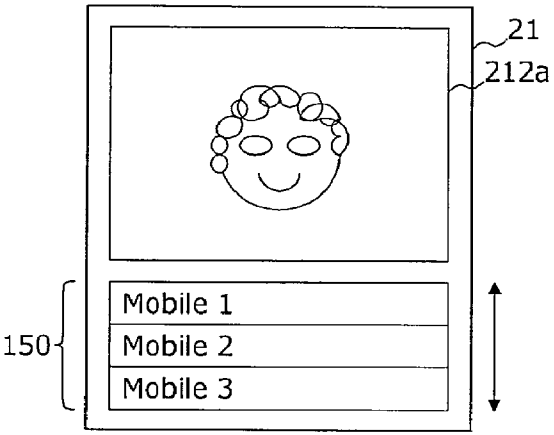
FIG. 9a is a diagram representing an exemplary user interface of an exemplary mobile device implementing a photograph management system in accordance with one embodiment of the present invention.
Figure 8A:
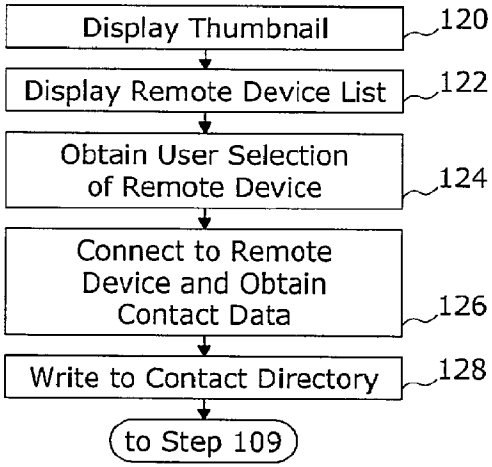
FIG. 8a is a flow chart diagram representing exemplary operation of a photograph management application in accordance with one embodiment of the present invention.

Turning briefly to FIG. 8a and FIG. 9a in conjunction with FIG. 1, one exemplary embodiment of alternate identification steps for identifying the person and obtaining contact information may comprise: i) displaying (on display 21) the extracted facial image 212a (as a thumbnail photograph) at step 120; and ii) displaying a listing 150 of a plurality of remote mobile devices 19 within a communication zone 11 defined by the region around the mobile device 10 within which the mobile device 10 may establish a communication session using a local communication system 50 at step 122.

In more detail, the local wireless communication system 50 may be any of a Bluetooth® radio, Infra Red communication module, near field communication (NFC) module or other system for short range communication with another compatible device. The photograph management application 42 drives the local communication system 50 to discover other mobile devices within the communication zone 11 and display the network name, network address, or other identifier of each such device. In the example wherein the local communication system 50 is a Bluetooth radio, the Bluetooth discovery protocols may be used.

Step 124 represents the photograph management application 42 prompting user selection of one of the identified remote mobile device shown in the listing 150 (FIG. 9a). The user may view the extracted facial image, recognize the person as one of the people photographed, and identify the remote mobile device owned by that person depicted in the digital photograph 14 as the selected remote mobile device.

At step 126 the photograph management application 42 initiates communication (either session or messaging) with the selected remote mobile device and obtains a personal contact record (e.g. an electronic business card) from the selected mobile device—if the selected mobile device is authorized by its user to deliver the electronic business card. It is also envisioned that the mobile device 10 may also, in return, provide an owner ID record 18 (as an electronic business card) back to the selected mobile device.

The personal contact record may be added to the contact directory 32 as a new contact record 34 (and the extracted facial image 212a added to such new contact record as the call line identification photograph 58) at step 128.

Returning to FIG. 7, step 109 again represents associating at least a portion of the contact information (in this case the information from the new contact record) with the photograph 14 at step 109.

Figure 9B:
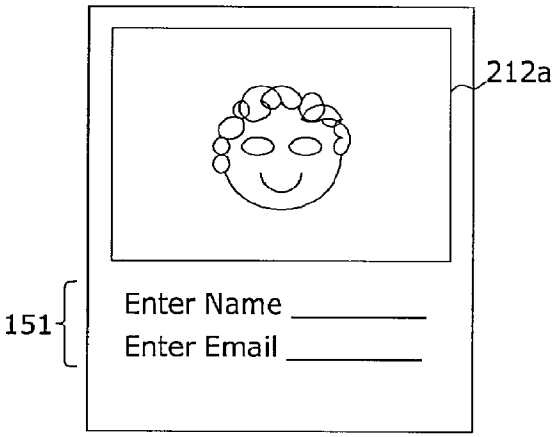
FIG. 9b is a diagram representing an exemplary user interface of an exemplary mobile device implementing a photograph management system in accordance with one embodiment of the present invention.
Figure 8B:
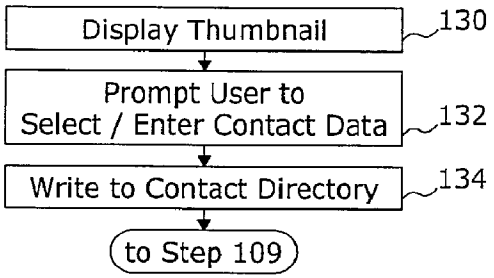
FIG. 8b is a flow chart diagram representing exemplary operation of a photograph management application in accordance with one embodiment of the present invention.

Turning briefly to FIG. 8b in conjunction with FIG. 9b, another exemplary embodiment of alternate steps for obtaining contact information includes displaying the extracted facial image 212a (as a thumbnail photograph) at step 130. In conjunction with the display of the extracted facial image 212a, manual data entry fields 150 may be displayed to prompt a user to select/enter contact information to associate with the person depicted in the extracted facial image 212a at step 132.

Step 134 represents writing the selected/entered contact information to a new contact record 34 of the contact directory 32 and, returning to FIG. 7, step 109 again represents associating the contact information (as manually entered) with the photograph 14 as metadata. Again, the extracted facial image 212a may be added to such new contact record 34 as its call line identification photograph 58.

Figure 10:
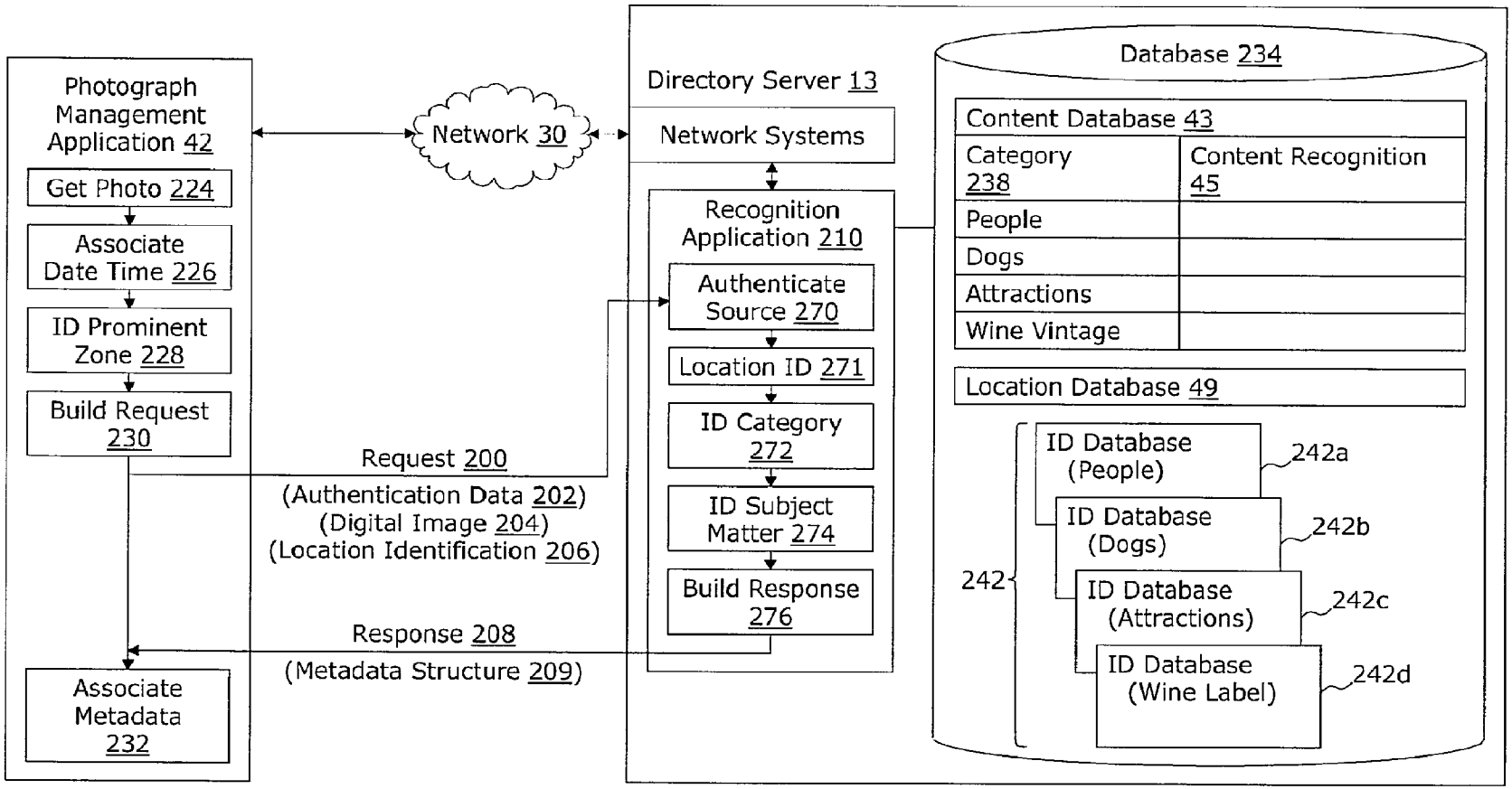
FIG. 10 is a diagram depicting exemplary architecture of an embodiment of the present invention wherein an information record is obtained from a remote directory server.

The diagram of FIG. 10 represents an exemplary aspect of operation of the photograph management application 42 for: i) obtaining an information record comprising information related to a digital photograph; and ii) associating at least a portion of the information record to the digital photograph as an XML metadata record 47 as depicted in any of FIGS. 2b, 3b, 45, and 5b when the information of such information record is provided by a remote directory server 13.

Step 224 represents the photograph management application 42 receiving the photograph 14 from the camera system 12.

Step 226 represents referencing an internal clock (not shown) to determine the date and time at which the digital photograph 14 was captured and associating such date and time to the digital photograph 14 by writing a date element 51 and a time element 52 to the metadata record 47 (FIGS. 2b, 3b, 4b, and 5b) associated with the digital photograph 14.

Step 228 represents identifying the prominent zone 16 wherein the primary content 15 is located. The prominent zone 16 will typically be the center of the photograph 14, but may be offset from the center. If offset, the prominent zone 16 may be recognized by its inclusion of prominent features as opposed to less prominent background.

Step 230 represents the photograph management application 42 building a request 200 for transfer to the directory server 13. The request 200 may include: i) authentication data 202 for enabling the directory server to identify and authenticate the source of the request 200; and ii) a digital image 204 which comprises at least a portion of a digital photograph 14 embodied in the prominent zone 16. Further, if available, the request 200 may include a location identification 206 which identifies the location at which the photograph was taken (for example a GPS location measured by the device that captured the digital photograph).

In response to receiving the request 200, a recognition application 210 of the directory server 13 returns an information record as a response 208. The information record of the response 208 may be a metadata structure 209 such as an XML record which includes information useful for the photograph management application to populate the metadata record 47 for association with the digital photograph 14 as depicted in FIGS. 2b, 3b, 4b, and 5b.

Returning briefly to FIG. 2a, as a first example, if the digital photograph 14 includes primary contents of people, the request 200 may include, as its digital image 204, the digital photograph 14 or a permutation of one or more extracted facial images 212a, 212b, and 212c—each representing the image of one of the people depicted in the digital photograph 14.

Referring briefly to FIG. 12a, an exemplary XML record 217 which may be returned as a response metadata structure 209 when the category is "people" may include: i) a category identifier element 55 identifying the category as "people"; ii) location elements 53 identifying the location at which the photograph was captured in terms of country, city, state, street address, region, or other human recognizable terms such as "Disney® Park"; and ii) a person ID element 211 for each person (e.g. each facial image included in the digital image 204) that the recognition application 210 is capable of identifying; and ii) for which the identified person has authorized release of identity to the source of the request 200.

The XML record 217 may further include, for each identifiable person: i) an email element 212 identifying the person's email address; and ii) a photograph sharing element 213 identifying whether the person desires to have a copy of the photograph in which he or she is depicted. The photograph sharing element 213 may also include identification of a network address (such as email address) to which the copy of the photograph is to be sent. It is envisioned that the XML record 217 may also include additional elements identifying other personal and/or contact information the identified person has authorized to be disclosed such as telephone number, text message address, etc.

Further, in a situation wherein the digital image(s) 204 include an image of a person that: i) can not be identified by the recognition application 210, or ii) the depicted person has not authorized disclosure of their personal information to the source of the request 200, the XML record 217 may include a data element 215 indicating "unidentified/unauthorized" in place of the person's personal data.

Returning briefly to FIG. 3a as a second example, if the digital photograph 14 includes primary contents of a dog, the request 200 may include, as its digital image 204, the digital photograph 14 or at least the portion of the prominent zone 16 depicting the dog.

Referring briefly to FIG. 12b, an exemplary XML record 217 which may be returned as a response metadata structure 209 when the category is "dogs" may include: i) a category identifier element 55 identifying the category as "dogs"; ii) location elements 53; and iii) sub data elements 57 further identifying the subject matter within the category of dogs such as breed, dog's name, owner's name.

Turning briefly to FIG. 4a in conjunction with FIG. 1, as a third example, if the digital photograph 14 includes primary contents of an attraction such as a ship, building, architecture or artistic structure, or other structure or object of interest, the request 200 may include, as its digital image 204, the digital photograph 14 or at least the portion of the prominent zone 16 depicting the attraction.

Referring briefly to FIG. 12c, an exemplary XML record 217 which may be returned as a response metadata structure 209 when the category is "attractions" may include: i) a category identifier element 55 identifying the category as "attractions"; ii) location elements 53; ii) an attraction identification element 218 identifying the attraction 216 depicted in the digital image 204; and iii) additional information elements 221 about the attraction 216 such as facts, statistics, and a URL for even more information about the attraction.

Turning briefly to FIG. 4a in conjunction with FIG. 1, as a third example, if the digital photograph 14 includes primary contents of a wine bottle label 220, the request 200 may include, as its digital image 204, the digital photograph 14 or at least the portion of the digital photograph depicting the label 220.

Referring briefly to FIG. 12d, an exemplary XML record 217 which may be returned as a metadata structure 209 when the category is "wine labels", may include: i) a category identifier element 55 identifying the category as "wine labels"; ii) location elements 53; iii) a vintage identification element 222 identifying the wine associated with the label 220 and iv) other data elements 224, 226, and 228 about the vintage. The other data elements 224, 226, and 228 may identify such information as: i) a location of the vineyard (data element 224); ii) awards won by the vintage (data element 226); and iii) other useful information about the vintage that wine connoisseurs may typically desire to know (data element(s) 228).

Returning to FIG. 10, after receiving the response 208, the photograph management application 42 associates the information included therein with the digital photograph 14 (as discussed with respect to FIGS. 2b, 3b, 4b, and 5b) at step 232 such that the digital photograph 14 may be included within a collection of digital photographs which may be stored, catalogued, sorted, and/or searched using the metadata associated there with.

To enable the recognition application 210 to provide the metadata structures 209 discussed with respect to FIGS. 12a, 12b, 12c, and 12d, the directory server 13 may include a database 234 for supporting operation of the recognition application 210. In the exemplary embodiment, the database 234 comprises: i) the location database 49 which associates GPS coordinates with location data in human recognizable form; ii) the content database 43 which, as discussed with respect to FIG. 6, associates each of a plurality of categories 238 with content recognition data 45 for determining whether a digital image 204 is within the category; and iii) a plurality of category specific identification level databases 242. In more detail, each category 238 is associated with an identification level database 242 which associates, for the category 238, subject matter within the image category with data about the subject matter.

For example, referring briefly to FIG. 11a, an exemplary identification database 242a associated with the exemplary image category of "people" is shown. The identification database 242a may include a plurality of records 244—each of which is associated with a person. As such, the record associates with the person: i) identification data 246 for recognizing an image of the person; ii) personal information 248 about the person such as the person's name 248a, email address 248b, telephone number 248c, and other data 248d; iii) a photograph sharing indicator 250—which indicates whether the person desires to have a copy of the photograph in which he or she is depicted (including identification of a network address, such as email address, to which the copy of the photograph is to be sent); and iv) group authorization data 252 which identifies a source, category of sources, group of sources, or other criteria for determining whether a source of a request 200 (FIG. 10) is authorized to receive the personal information 248 if the person is depicted in the digital image 204 of such request.

The group authorization data 252 may, for purposes of identifying a source, category of sources, group of sources, or other criteria, identify and/or reference: i) the person's friends/acquaintances/contact list from a social networking web site for purposes of such identification; and/or ii) identify clubs, groups, or organizations, or member lists thereof for purposes of such identification.

Referring to FIG. 11b, an exemplary identification database 242b associated with the exemplary image category of "dogs" is shown. The identification database 242b may include, as an example, records associated with a plurality of breeds 268. Associated with each breed 268 may be: i) identification data 269 for identifying whether an image of a dog depicts the breed; and ii) descriptive data 271 about the breed 268 useful for populating the elements 57 of the XML record discussed with respect to FIG. 12b.

Referring to FIG. 11c, an exemplary identification database 242c associated with the exemplary image category of "attractions" is shown. The identification database 242c may include a plurality of attraction lists 254, each associated with one of a plurality of predetermined locations 256.

Each attraction list 254 includes identification of a plurality of attractions (attraction identifier 255) visible from the predetermined location 256 with which the list 254 associates. Associated with the attraction identifier 255 are identification data 258 for identifying an image of the attraction within a digital image 204 and descriptive data 260 about the attraction.

For example, one of the predetermined locations (location 256a) may include the Disney® Park, Orlando, Fla. (identified in a manner such that the location identification 206 of a request 200 (FIG. 10) may by associated therewith). As such, the attraction list 254 associated with Disney® Park, Orlando, Fla. may identify those attractions in and/or visible from Disney® Park, Orlando, Fla.—such as the Pirate's Ship. In the example of the Pirate's Ship, the identification data 258 may include characteristic data or image data for identifying an image of the ship. The descriptive data 260 may include any of facts about the ship, statistics, and a URL for obtaining even more information.

Referring to FIG. 11d, an exemplary identification database 242d associated with the exemplary image category of "wine vintage" is shown. The identification database 242d may include a plurality of records 262, each associated with a vintage of wine. Each record 262 associates the vintage with identification data 264 for identifying the vintage's bottle label within a digital image 204 of a request 200 (FIG. 10) and descriptive data 266 about the vintage such as, as discussed with respect to FIG. 4b, vineyard location 224, awards won by the vintage 226, and other useful information 228 about the vintage that wine connoisseurs may typically desire to know.

Returning to FIG. 10, the recognition application 210 typically operates as follows. Upon receipt of the request 200, the recognition application 210 authenticates the source of the request 200 at step 270. In various exemplary embodiments, authentication of the source may include establishing an authenticated TCP/IP session and/or a web services session (e.g. SOAP messaging) and transferring the request 200 therewith.

Step 271 represents referencing the location database 49 to obtain location data for populating location elements 53 (in human recognizable terms) into the exemplary metadata structures discussed with respect to FIGS. 12a, 12b, 12c, and 12d.

Step 272 represents determining a selected image category of the digital image 204 of the request 200 by applying the content recognition data 45 of the content database 236 to the digital image 204 to determine a selected image category. The selected image category is the image category 238 to which the digital image 204 corresponds. As discussed, this may include comparing the features of the digital image 204 to the features of the content recognition data 45 of each category 238 to determine the category of the digital image 204.

Step 274 represents comparing the digital image 204 of the request 200 to the subject matter within the identification database 242 associated with the selected image category to: i) determine selected subject matter; and ii) obtain selected information about the selected subject matter. The selected subject matter is the subject matter with which the digital image corresponds (e.g. the subject matter depicted in the digital image 14). The selected information is the information used to build the response metadata structure 209 discussed with respect to FIGS. 12a, 12b, 12c, and 12d.

For example, if at step 272, the category is determined to be "people", then at step 274 the digital image 204 is compared to the identification data 246 of each record 244 of the identification database 242a (FIG. 11a) to identify the person(s) depicted in the digital image 204. The selected information may be at least a portion of the personal information 248 of the record 244 associated with the identified person.

As another example, if at step 272 the category is determined to be "dogs", then at step 274 the digital image 204 is compared to the ID data 269 for each breed 268 to determine the breed of the dog depicted in the digital image 204. The selected information may be at least a portion of the descriptive data 271 associated with the identified breed.

As yet another example, if at step 272, the category is determined to be "attractions", then at step 274 the digital image 204 is compared to the identification data 258 in the attraction list 254 corresponding to the predetermined location 256 that corresponds to the location identification 206 of the request to identify the attraction depicted in the digital image 204. The selected information may be at least apportion of the descriptive data 260 associated with the identified attraction 255.

As yet another example, if at step 272 the category is determined to be "wine labels", then at step 274 the digital image 204 is compared to the identification data 264 for each vintage to determine the vintage of wine with which the label 220 (FIG. 5a) depicted in the image 204 corresponds. The selected information may be at least a portion of the descriptive data 266 associated with such vintage.

In all of the above examples, step 276 represents building the response metadata structure and initiating its return to the photograph management application 42 as the response 208 to its request.

Although the invention has been shown and described with respect to certain preferred embodiments, it is obvious that equivalents and modifications will occur to others skilled in the art upon the reading and understanding of the specification. As one example, the metadata structure represented in FIGS. 2a, 2b, 2c, and 2d are represented as an XML record. Such representation is exemplary only and not intended to limit the scope of the invention as described in the appended claims. Those skilled in the art will recognize that other equivalent metadata structures exist and the selection of any particular data structure for associating metadata describing the contents of a digital photograph with the digital photograph is a matter of design choice.

As a second example, the flow chart of FIG. 7 depicts an exemplary embodiment wherein the information record for association with a digital photograph is obtained form sources of information local to the mobile device and the diagram of FIG. 10 depicts an exemplary embodiment wherein the information record (or at least the primary content portion of an information record) is obtained from a remote directory server. Those skilled in the art will recognize that combinations of obtaining a portion of the information record (such as category) from local data sources and obtaining a portion of the information record from a remote server is a matter of design choice. For example it is envisioned the local sources may be used for determining that a digital photograph is within the category of people and remote sources may be used for identifying multiple people depicted in the photograph. However, additional people depicted in the digital photograph may be identified by the directory server.

As yet a third example, the diagram of FIG. 10 represents the directory server interacting with the photograph management application of the mobile device as the client generating the request to the directory server. Those skilled in the art will recognize that the directory server may also receive requests from, and provide responses to, any of a traditional photo album application operating on a traditional desk top or notebook computer.

The present invention includes all such equivalents and modifications, and is limited only by the scope of the following claims.

The invention claimed is:

1. A mobile device comprising:

a camera for capturing a digital photograph;

[a] *at least one processing* module comprising*:*

*a primary content database comprising, for each of a plurality of categories, a category identifier and content recognition data associated with the category; and*

*a processor configured to execute* a photograph management application *comprising software code that, when executed by the processor, causes the mobile device to*:

[receiving] *receive* the digital photograph;

*apply the content recognition data for each of the plurality of categories of the primary content database to an image depicted in the digital photograph to identify a selected category, the selected category being the category that includes content recognition data with which the image corresponds;*

[obtaining] *obtain* an information record comprising information related to the digital photograph *based on the identification of the selected category*; and

[associating] *associate* at least a portion of the information related to the digital photograph with the digital photograph[; and a primary content database associating, for each of a plurality of categories, an identification of a category with content recognition data;

wherein the photograph management application obtains the information record by applying the content recognition data for each of the plurality of categories of the primary content database to an image depicted in the digital photograph to identify a selected category, the selected category being the category that includes content recognition data with which the image corresponds;

and obtaining the information record based on the identification of the selected category].

2. The mobile device of claim 1:

wherein: the selected category is a person [and further comprising:

a network communication system];

*the mobile device further comprises a user interface and a network communication system;*

*the at least one processing module further comprises* a contact directory storing a plurality of contact records, each contact record including contact information identifying a person [and], at least one network address associated with the person, [the contact record further including] *and* a facial image of the person; and

[a user interface for enabling selection of a contact record and initiating a communication to the network address included in the contact record via the network communication system; and]

*the photograph management application further comprises software code that, when executed by the processor, causes the mobile device to:*

*receive a selection of a contact record via the user interface;*

[wherein the photograph management application obtains] *obtain* the information record by identifying a selected contact record as the information record, the selected contact record being a one of the plurality of contact records that includes a facial image with which at least one facial image depicted in the digital photograph matches*; and*

*initiate communication to the network address included in the selected contact record via the network communication system.*

3. The mobile device of claim 2 wherein:

the *selected* contact record further includes a photograph sharing indicator identifying one of a photograph sharing setting and a photograph non-sharing setting; and the photograph management application initiates transmission of a copy of the *digital* photograph to [an identified address if] *the network address included in the selected contact record when* the photograph sharing indicator included in the selected contact record identifies the photograph sharing setting.

4. The mobile device of claim 2:

wherein[, with respect to each contact record,]: the facial image of the person included in the *selected* contact record is a call line identification photograph, and the [mobile device] *at least one processing module* further comprises a telephony application [for placing and receiving] *that, when executed by the processor, causes the mobile device to:*

*place and receive* telephone calls via the network communication system[, the telephony application further driving the user interface to]*; and* display the call line identification photograph of a contact record when a caller ID signal of [an incoming] *a received telephone* call matches a telephone number in the *selected* contact record.

5. The mobile device of claim 1:

wherein:

the selected category is a person;

and *the mobile device* further [comprising] *comprises* a local communication system for communicating with remote mobile devices within a communication zone surrounding the mobile device [in which the mobile device may electronically communicate; and wherein the photograph management application obtains] *the software code comprising the photograph management application, when executed by the processor, causes the mobile device to obtain* the information record by:

displaying an indication of each of a plurality of remote mobile devices within the communication zone;

displaying the at least one facial image depicted in the digital photograph;

obtaining user selection of a selected remote mobile device, the selected remote mobile device being a one of the plurality of remote mobile devices associated by the user with the facial image depicted in the digital photograph; and obtaining, as the information record, a personal contact record from the selected remote mobile device, the personal contact record comprising identification of the user of the selected remote mobile device.

6. The mobile device of claim 5, wherein:

the personal contact record further includes a photograph sharing indicator identifying one of a photograph sharing setting and a photograph non-sharing setting; and the photograph management application initiates transmission of a copy of the photograph to the selected remote mobile device if the photograph sharing indicator identifies the photograph sharing setting.

7. The mobile device of claim 5[:

further comprising] *wherein the processing module further comprises* a contact directory [storing] *that stores* a plurality of contact records, each contact record including contact information identifying a person and a call line identification photograph of the person *available* for display when an incoming telephone call includes a caller ID signal corresponding to the contact record; and

[wherein] the photograph management application further[:

associates] *comprises software code that, when executed by the processor, causes the mobile device to associate* the facial image depicted in the digital photograph with the personal contact record as its call line identification photograph[;] and

[writes] *to write* the personal contact record to the contact directory.

8. The mobile device of claim 5, wherein the photograph management application [only obtains] *causes the mobile device to obtain* the personal contact record *only when the mobile device receives authorization* from the selected remote mobile device if the selected remote mobile device [is configured to authorize transmission of the personal contact record to the mobile device].

9. The mobile device of claim 5*, wherein*:

*the processing module* further [comprising] *comprises* an owner identification record, the owner identification record including identification of the owner of the mobile device and a sharing indicator identifying one of a sharing setting and a non-sharing setting; and

[wherein] *the photograph management application further comprises software code that, when executed by the processor, causes* the mobile device [provides] *to provide* the owner identification record to a remote mobile device within the communication zone [upon] *in response to receiving a request from* the remote mobile device [initiating a request] for the owner identification record.

10. The mobile device of claim 1*, wherein*:

[further comprising] *the mobile device further comprises* a network communication system; and

[wherein the photograph management application obtains] *the software code comprising the photograph manage-*

*ment application, when executed by the processor, causes the mobile device to obtain* the information record by:

initiating a request to a remote directory server via the network communication system, the request including a digital image embodying at least a portion of the digital photograph; and receiving a response from the remote directory server via the network communication system, the response comprising the information record.

11. The mobile device of claim 10 wherein the selected category is person and:

the digital image is a facial image of a person depicted in the digital photograph; and the information record comprises a personal contact record, the personal contact record including an identification of the person depicted in the digital photograph.

12. The mobile device of claim 11, wherein:

the *selected* personal contact record further includes a photograph sharing indicator identifying one of a photograph sharing setting and a photograph non-sharing setting; and the photograph management application initiates transmission of a copy of the *digital* photograph to [an identified address if] *the network address included in the selected personal contact record when* the photograph sharing indicator identifies the photograph sharing setting.

13. The mobile device of claim 10, wherein:

the request *to the remote directory server* further includes a source identification, the source identification identifying the mobile device, the information record comprises a personal contact record if the source identification is within a group authorization record associated with the person depicted in the digital photograph, the *personal* contact record including identification of the person depicted in the digital photograph; and the information record comprises an indication that identification *that* the person depicted in the digital photograph is unauthorized if the source identification is not within the group authorization record associated with the person depicted in the digital photograph.

14. The mobile device of claim 10 wherein the selected category is an attraction and:

*the mobile device* further [comprising] *comprises* a global positioning system for identifying a location at which the digital photograph was captured; [and wherein:]

the digital image is an image of an attraction depicted in the digital photograph;

the request further comprises a location identifier identifying the location at which the photograph was captured; and the information record comprises description data associated with the attraction.

15. The mobile device of claim 14 wherein the description data associated with the attraction comprises a geographical identifier identifying a region within which the digital photograph was captured.

16. The mobile device of claim 14 wherein the description data associated with the attraction comprises identification of the attraction.

17. The mobile device of claim 10 wherein the selected category is a wine bottle label:

the digital image is an image of a wine bottle label depicted in the digital photograph and identifying a vintage of wine; and the information record comprises descriptive data associated with the vine vintage.

18. The mobile device of claim 1, *wherein*:

*the mobile device* further [comprising] *comprises* a communication system for communication with remote mobile devices; and

[wherein the photograph management application further exchanges] *the software code comprising the photograph management application, when executed by the processor, causes the mobile device to exchange* content recognition data with a selected remote mobile device.

19. The mobile device of claim 18, wherein the *software code comprising the* photograph management application [further applies], *when executed by the processor, identifies the selected category by applying* content recognition data received from the selected remote mobile device to the image depicted in the digital photograph [to identify the selected category].

20. The mobile device of claim 1, *wherein*:

*the mobile device* further [comprising:] *comprises* a user interface including a display screen and [a] *an* information entry system; and

[wherein] the photograph management application further[:

displays] *comprises software code that, when executed by the processor, causes the mobile device to display* the image in association with an identification of the selected category[;] and

[uses] *use* the identification of the selected category as the information record [only if the user confirms proper categorization] *in response to receiving a confirmation signal from the user interface*.

21. The mobile device of claim 20, wherein the photograph management application further[:

obtains] *comprises software code that, when executed by the processor, causes the mobile device to obtain* user entry of a new category identifier as the information record via the information entry system;

[associates] *and associate* the image, as content recognition data, with the new category identifier as a new category in the primary content database.

22. A method of operating a mobile device to obtain and associate text based information with a digital photograph captured by the mobile device, the method comprising:

capturing a digital photograph;

obtaining an information record comprising information related to the digital photograph; and associating at least a portion of the information related to the digital photograph with the digital photograph;

wherein the information record is obtained by applying content recognition data for each of a plurality of categories of a primary content database to an image depicted in the digital photograph to identify a selected category, the selected category being the category that includes content recognition data with which the image corresponds.

23. The method of claim 22:

wherein the selected category is a person and the information record is obtained by identifying a selected contact record from a contact directory as the information record:

the contact directory storing a plurality of contact records, each contact record including contact information identifying a person and at least one network address associated with the person, the contact record further including a facial image of the person; and the selected contact record being a one of the plurality of contact records that includes a facial image with which at least one facial image depicted in the digital photograph matches.

24. The method of claim 23, wherein:

the contact record further includes a photograph sharing indicator identifying one of a photograph sharing setting and a photograph non-sharing setting; and the method further comprises initiating transmission of a copy of the photograph to an identified address if the photograph sharing indicator included in the selected contact record identifies the photograph sharing setting.

25. The method of claim 23:

wherein, with respect to each contact record, the facial image of the person included in the contact record is a call line identification photograph, and the method further comprises driving the user interface to display the call line identification photograph of a contact record when a caller ID signal of an incoming call matches a telephone number in the contact record.

26. The method of claim 22:

wherein the selected category is a person and the information record is obtained by:

displaying an indication of each of a plurality of remote mobile devices within a communication zone, the communication zone being a zone surrounding the mobile device in which the mobile device may electronically communicate via a local communication system;

displaying the at least one facial image depicted in the digital photograph;

obtaining user selection of a selected remote mobile device, the selected remote mobile device being a one of the plurality of remote mobile devices associated by the user with the facial image depicted in the digital photograph; and obtaining, as the information record, a personal contact record from the selected remote mobile device, the personal contact record comprising identification of the user of the selected remote mobile device.

27. The method of claim 26, wherein:

the personal contact record further includes a photograph sharing indicator identifying one of a photograph sharing setting and a photograph non-sharing setting; and the method further comprises initiating transmission of a copy of the photograph to the selected remote mobile device if the photograph sharing indicator identifies the photograph sharing setting.

28. The method of claim 26:

further comprising associating the facial image depicted in the digital photograph with the personal contact record as its call line identification photograph; and writing such personal contact record to a contact directory storing a plurality of contact records, each contact record including contact information identifying a person and a call line identification photograph of the person for display when an incoming telephone call includes a caller ID signal corresponding to the contact record.

29. The method of claim 26, wherein the personal contact record is obtained from the selected remote mobile device only if the selected remote mobile device is configured to authorize transmission of the personal contact record to the mobile device.

30. The method of claim 26, further comprising providing an owner identification record to a remote mobile device within the communication zone upon the remote mobile device initiating a request for the owner identification record, the owner identification record including identification of the owner of the mobile device.

31. The method of claim 22, wherein the information record is obtained by:

initiating a request to a remote directory server via the network communication system, the request including a digital image embodying at least a portion of the digital photograph; and receiving a response from the remote directory server via the network communication system, the response comprising the information record.

32. The method of claim 31, wherein the selected category is a person and:

the digital image is a facial image of a person depicted in the digital photograph; and the information record comprises a personal contact record, the personal contact record including an identification of the person depicted in the digital photograph.

33. The method of claim 32, wherein:

the personal contact record further includes a photograph sharing indicator identifying one of a photograph sharing setting and a photograph non-sharing setting; and the method further comprises initiating transmission of a copy of the photograph to an identified address if the photograph sharing indicator identifies the photograph sharing setting.

34. The method of claim 31, wherein:

the request further includes a source identification, the source identification identifying the mobile device, the information record comprises a personal contact record if the source identification is within a group authorization record associated with the person depicted in the digital photograph, the contact record including identification of the person depicted in the digital photograph; and the information record comprises an indication that identification the person depicted in the digital photograph is unauthorized if the source identification is not within the group authorization record associated with the person depicted in the digital photograph.

35. The method of claim 31, wherein the selected category is an attraction:

the digital image is an image of an attraction depicted in the digital photograph;

the request further comprises a location identifier identifying the location at which the photograph was captured as measured by a global positioning system; and the information record comprises description data associated with the attraction.

36. The method of claim 35, wherein the description data associated with the attraction comprises a geographical identifier identifying a region within which the digital photograph was captured.

37. The method of claim 35, wherein the description data associated with the attraction comprises identification of the attraction.

38. The method of claim 31, wherein the selected category is a wine bottle and:

the digital image is an image of a wine bottle label depicted in the digital photograph and identifying a vintage of wine; and the information record comprises descriptive data associated with the vine vintage.

39. The method of claim 22, further comprising:

displaying the image in association with an identification of the selected category; and using the identification of the selected category as the information record if the user confirms proper categorization via an information entry system.

40. The method of claim 39, further comprising:

obtaining user entry of a new category identifier as the information record via the information entry system;

associating the image, as content recognition data, with the new category identifier as a new category in the primary content database.

* * * * *